United States Patent [19]
Larsen et al.

[11] Patent Number: 4,627,519
[45] Date of Patent: Dec. 9, 1986

[54] HYDRAULIC DISK BRAKE HAVING A BRAKING TORQUE-TO-HYDRAULIC FORCE CONVERTER

[75] Inventors: Lorin V. Larsen, Long Beach; Brian L. Eidem, Cerritos, both of Calif.

[73] Assignee: Armco Inc., Middletown, Ohio

[21] Appl. No.: 594,795

[22] Filed: Mar. 29, 1984

[51] Int. Cl.4 .................. B60T 13/12; B66D 1/44
[52] U.S. Cl. ........................ 188/1.11; 188/182; 188/187; 254/379
[58] Field of Search ............. 188/1.11, 151 R, 151 A, 188/180, 181 R, 181 A, 181 C, 181 T, 182, 187; 254/379, 378; 303/104

[56] References Cited

U.S. PATENT DOCUMENTS

| | | | |
|---|---|---|---|
| 2,308,499 | 1/1943 | Eksergian | 188/181 R X |
| 2,490,941 | 12/1949 | Bell et al. | 188/151 R X |
| 2,759,702 | 8/1956 | Abraham | 188/180 X |
| 2,781,871 | 2/1957 | Altekruse | 188/181 R X |
| 2,843,228 | 7/1958 | Wysor | 188/180 |
| 2,992,860 | 7/1961 | Hirzel | 303/20 X |
| 2,999,567 | 9/1961 | Adams | 188/181 T |
| 3,058,547 | 10/1962 | Tiley et al. | 188/151 R |
| 3,131,975 | 5/1964 | Smith et al. | 303/104 |
| 3,155,196 | 11/1964 | Foxx | 188/174 X |
| 3,173,517 | 3/1965 | Powlas | 188/346 |
| 3,348,637 | 10/1967 | Perez | 188/346 |
| 3,386,536 | 6/1968 | Davidson | 188/151 A X |
| 3,537,759 | 11/1970 | Du Bois | 188/181 R X |
| 3,685,288 | 8/1972 | Cordrey | 188/170 X |
| 3,695,733 | 10/1972 | Alderton | 188/181 R X |
| 3,700,075 | 10/1972 | Mortimer et al. | 188/346 |
| 3,759,489 | 9/1973 | Jones | 254/273 |
| 3,872,952 | 3/1975 | Poggie | 188/181 T |
| 3,923,345 | 12/1975 | Poggie | 188/181 T |
| 4,043,607 | 8/1977 | Signorelli et al. | 303/100 |
| 4,046,235 | 9/1977 | Shutt | 188/134 |
| 4,074,891 | 2/1978 | Ritter | 254/361 |
| 4,144,953 | 3/1979 | Johnson et al. | 188/134 |
| 4,234,063 | 11/1980 | Blake | 188/181 T |

FOREIGN PATENT DOCUMENTS 1019982 2/1966 United Kingdom .
2093544 9/1982 United Kingdom .

Primary Examiner—Bruce H. Stoner, Jr.
Assistant Examiner—Richard R. Diefendorf
Attorney, Agent, or Firm—Roylance, Abrams, Berdo & Goodman

[57] ABSTRACT

A hydraulic disk brake apparatus especially useful for braking the rotation of a hoisting drum used to support a drill string in a well. The apparatus comprises a hydraulic fluid pump having an actuating lever, a pair of brake calipers having hydraulically actuated friction pads for engaging a brake disk coupled to the drum for rotation therewith, hydraulic fluid lines interconnecting the pump and the friction pads, and a mechanism for converting the braking reaction force caused by the torque applied to the calipers, when the pads engage the rotating disk, to an additional hydraulic force proportional to the amount of torque so applied to the calipers and applying this additional hydraulic force to the pads. This renders the braking action self-energized and provides a physical indication, i.e., a "feel", in the brake actuating lever reflecting the braking action actually take place on the drum. In a first embodiment, this converter mechanism comprises a pivotal torque lever coupled to the calipers and a hydraulic load cell engageable by the torque lever. In a second embodiment, this mechanism comprises a shear-measuring strain gauge and a hydraulic load cell.

13 Claims, 9 Drawing Figures

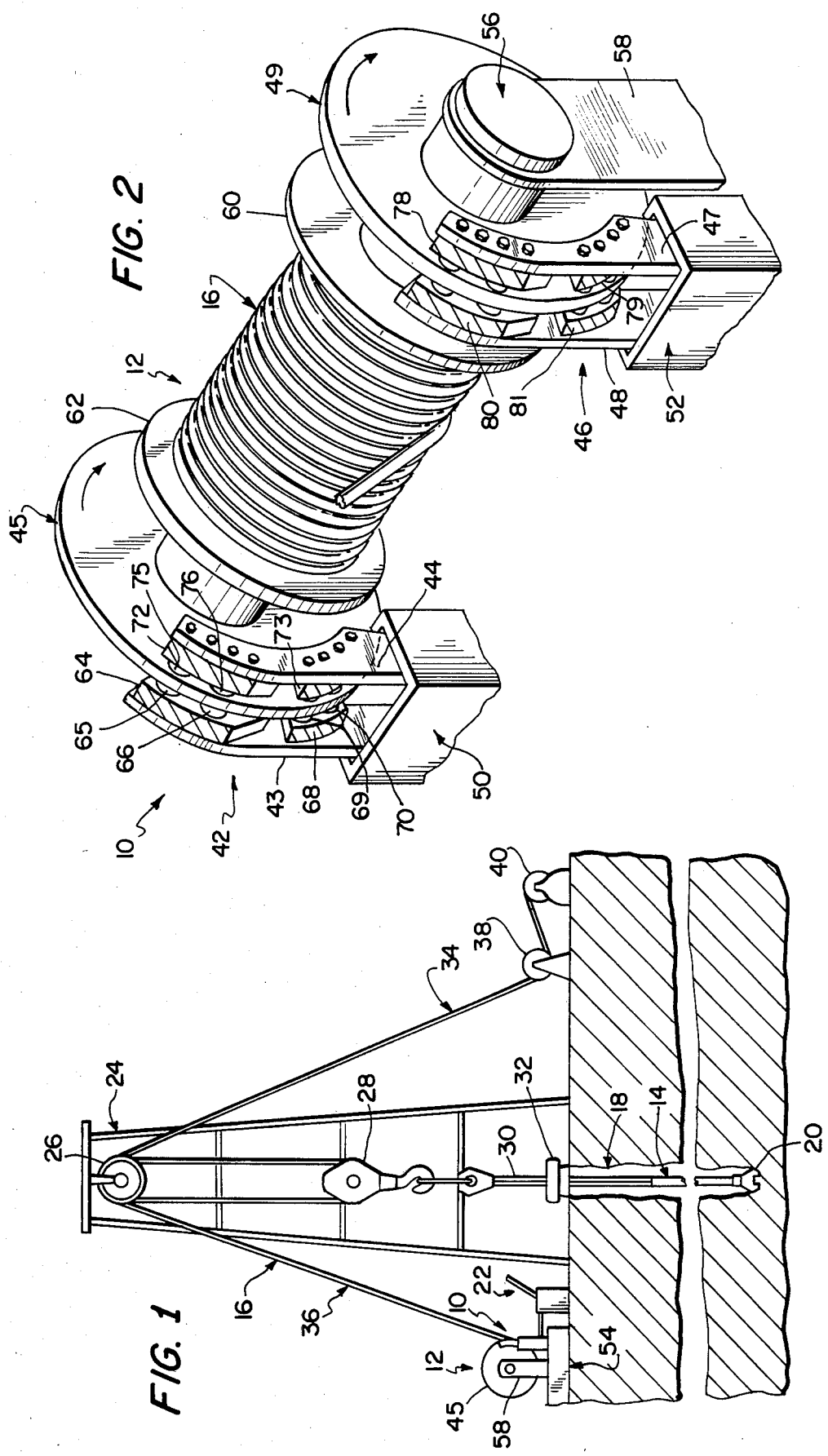

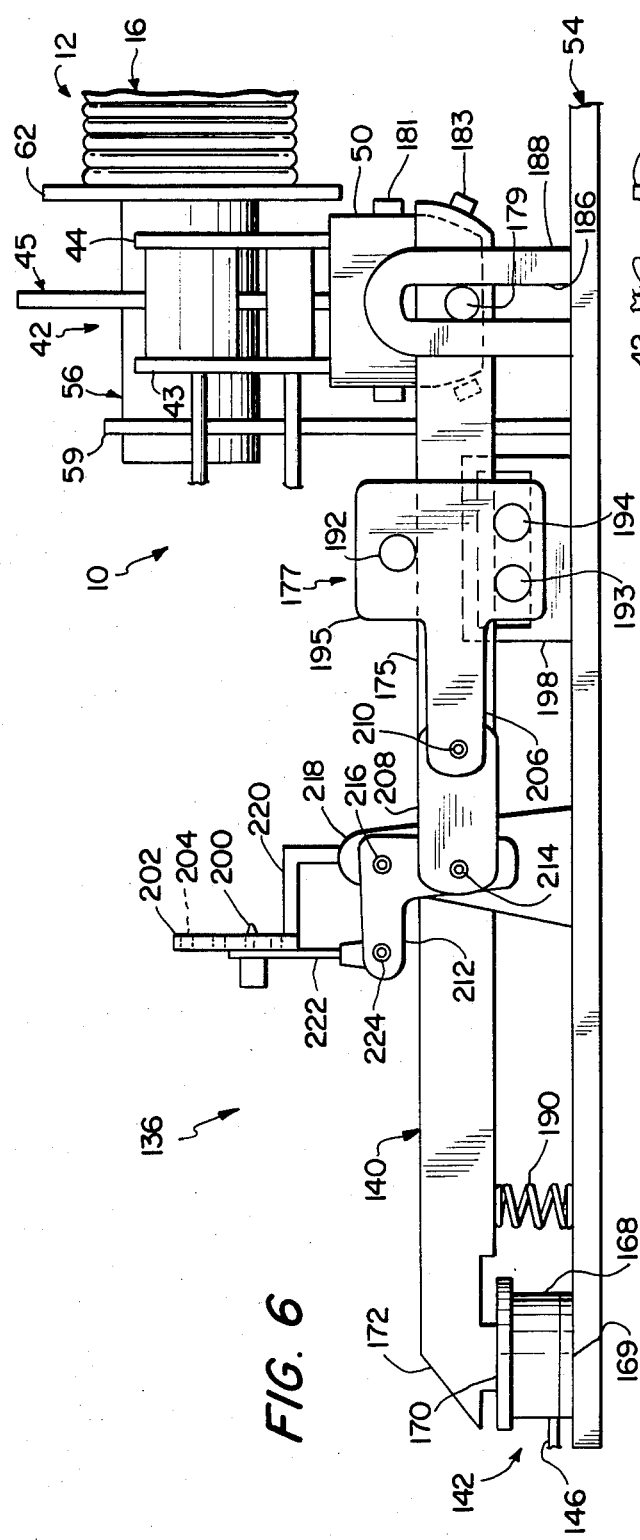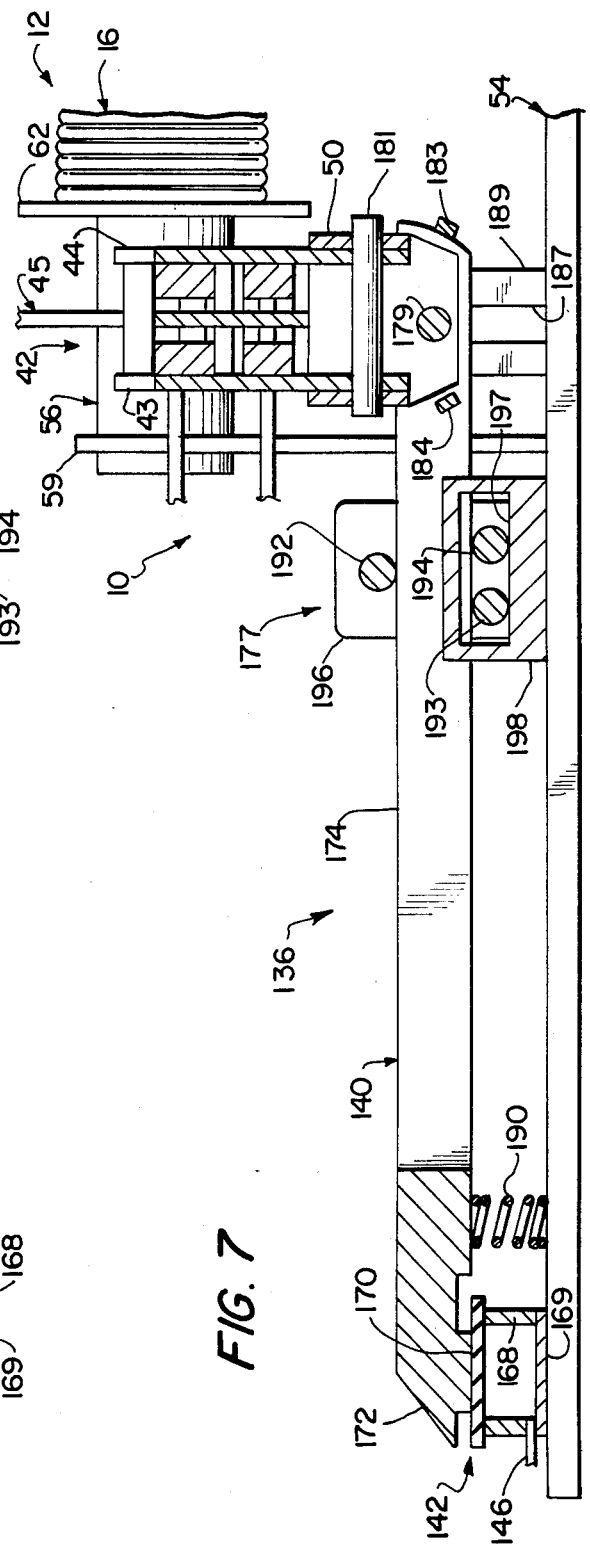

4,627,519

HYDRAULIC DISK BRAKE HAVING A BRAKING TORQUE-TO-HYDRAULIC FORCE CONVERTER

FIELD OF THE INVENTION

The invention relates to hydraulic disk brakes especially useful for braking the rotation of a hoisting drum used to support a drill string in a well. The invention includes a converter mechanism for converting the braking reaction force caused by the torque applied to the disk brake calipers during braking of the drum to a hydraulic force proportional to the amount of torque so applied to the calipers and then applying this force to the brake pads in the calipers. This renders the braking action self-energized and provides a physical indication in the brake actuating lever reflecting the braking action actually taking place on the drum.

BACKGROUND OF THE INVENTION

Cable hoisting drums are used extensively in oil exploration for raising and lowering the drill string having the drill bit at the end. Since such a drill string can be hundreds of feet long and therefore extremely heavy, durable and powerful brakes must be utilized to control the rotation of the hoisting drum as it lowers thousands of pounds of drill string.

In the past, band brakes have been used on these hoisting drums, and these types of brakes are rather effective in certain aspects, including giving the operator a "feel" of whether or not the brake is actually controlling rotation of the drum, this feel being delivered to the actuating lever used by the operator. In addition, these band brakes are advantageous since they are self-energizing, i.e., the braking reaction force generated between the band and the drum assists in applying the braking force. However, these band brakes have several disadvantages. First, they wear out reasonably quickly and secondly they are time-consuming to replace, thereby interfering with the drilling operation. Moreover, band brakes are known to slip, especially under adverse weather conditions.

While hydraulic disk brakes would overcome these disadvantages, they have had up until now their own disadvantages of not being self-energizing and also not providing an actuating lever feel, or signal, to the operator that the braking action is actually taking place on the drum.

Examples of these known band brake systems and several disk brake systems are disclosed in the following U.S. Pat. Nos.: 2,308,499 to Eksergian; 2,490,941 to Bell et al; 2,781,871 to Altekruse; 2,992,860 to Hirzel; 2,999,567 to Adams; 3,058,547 to Tiley et al; 3,155,196 to Foxx; 3,386,536 to Davidson; 3,537,759 to Du Bois; 3,759,489 to Jones; 4,043,607 to Signorelli et al; 4,046,235 to Shutt; 4,074,891 to Ritter; and 4,144,953 to Johnson et al.

SUMMARY OF THE INVENTION

Accordingly, a primary object of the invention is to provide a hydraulic disk brake apparatus for use with a rotating drum that is self-energizing and provides a physical indication to the brake operator that the braking action is actually taking place.

Another object of the invention is to provide such a hydraulic disk brake apparatus that utilizes a converter of the braking torque to a hydraulic force, thereby providing a self-energizing brake and the physical indication of braking action to the operator.

A further object of the invention is to provide such a hydraulic disk brake apparatus that does not wear out quickly, is easily and quickly replaced, and resists slippage, even in adverse weather conditions.

A further object of the invention is to provide a method of braking a rotating drum using a hydraulic disk brake having a braking torque-to-hydraulic force converter.

A further object of the invention is to provide a hydraulic disk brake apparatus that is especially useful for braking the rotation of a hoisting drum used to support a drill string in a well.

According to particularly advantageous embodiments of the invention, the foregoing objects are basically attained by providing a disk brake apparatus for a drum mounted for rotation and having a brake disk coupled for rotation therewith including, the combination comprising: a support located adjacent the drum; a pair of brake calipers having a friction pad thereon located adjacent a side of the brake disk, and having a hydraulic rectilinear motor for driving the pad against the brake disk; a mechanism for coupling the calipers to the support; a hydraulic fluid pump having an actuating lever movable between first and second positions and generating a hydraulic force proportional to the location of the lever between the first and second positions; a hydraulic fluid line interconnecting the pump and the motor for delivering the hydraulic force to the motor and thus to the friction pad as generated by the actuating lever; and a converter mechanism, coupled to the pair of brake calipers and to the hydraulic fluid line, for converting the braking reaction force caused by the torque applied to the calipers, when the friction pad engages the rotating disk, to an additional hydraulic force proportional to the amount of torque so applied to the calipers and applying this additional hydraulic force to the motor.

In a first embodiment, the converter mechanism comprises a pivotal torque lever coupled to the calipers and a hydraulic load cell engageable by the torque lever.

In a second embodiment, the converter mechanism comprises a shear-measuring strain gauge and a hydralic load cell.

In addition to using merely one brake disk on a drum with only a single pair of brake calipers, a pair of brake disks can be used with two pairs or more of brake calipers, thereby balancing the braking forces applied to the drum.

Other objects, advantages and salient features of the invention will become apparent from the following detailed description, which, taken in conjunction with the annexed drawings, discloses preferred embodiments of the invention.

DRAWINGS

Referring now to the drawings which form a part of this original disclosure:

FIG. 1 is a diagrammatic elevational view in partial section showing a cable hoisting drum having the disk brake apparatus in accordance with the invention connected thereto, this hoisting drum being used to raise and lower a drill string in a well;

FIG. 2 is an enlarged fragmentary perspective view of the disk brake apparatus in accordance with the invention showing two pairs of brake calipers engaging a pair of brake disks coupled for rotation with a cable hoisting drum;

FIG. 6 is an enlarged side elevational view of the torque converter and pair of brake calipers shown in FIG. 3;

FIG. 7 is a longitudinal cross-sectional view of the structure shown in FIG. 6;

DETAILED DESCRIPTION OF THE INVENTION

Figure 3:
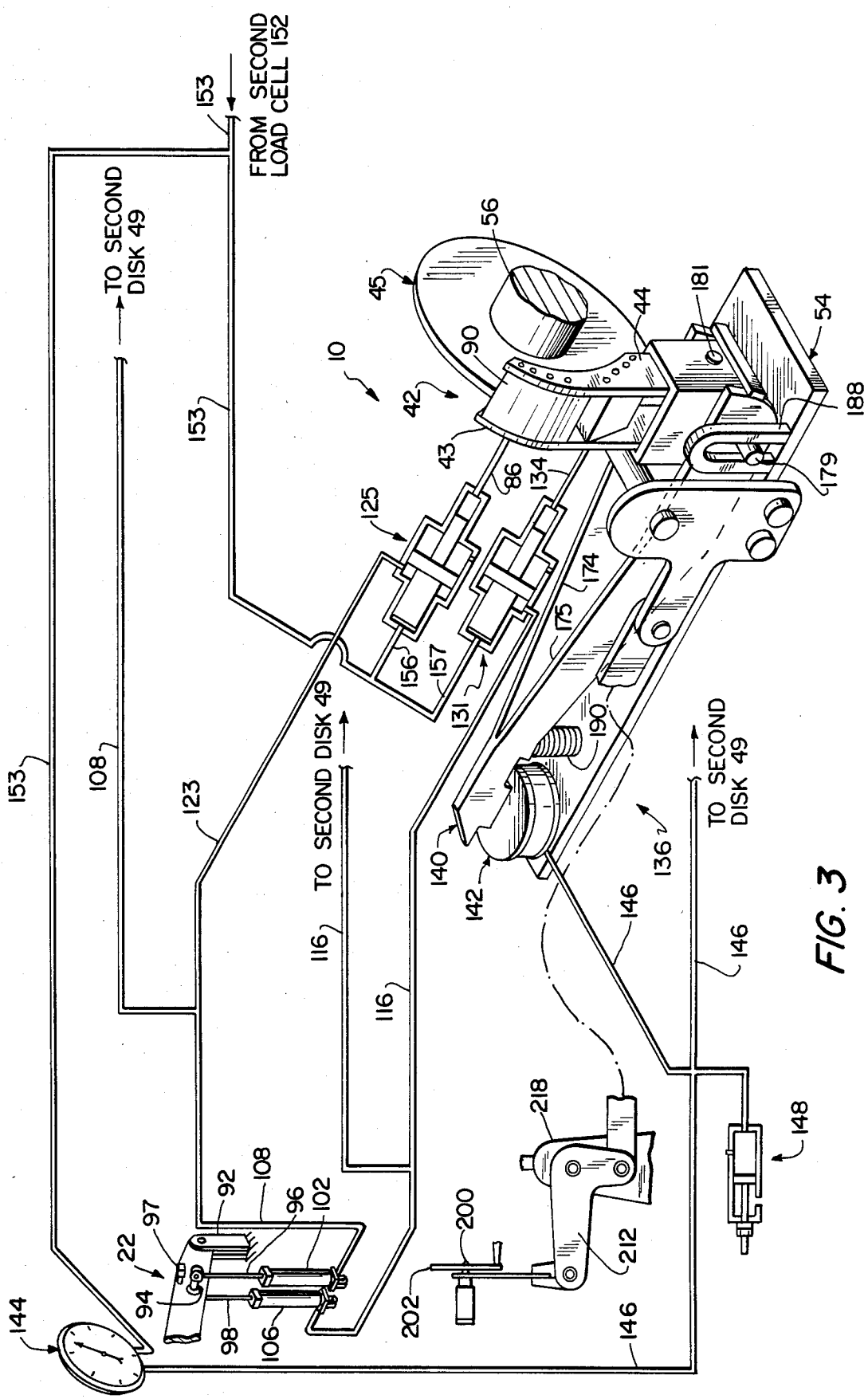
FIG. 3 is a diagrammatic perspective view of one of the disk brakes shown in FIG. 2 with the addition of a torque converter and a hydraulic schematic used in conjunction therewith.

As seen in FIGS. 1-4, the disk brake apparatus 10 in accordance with the invention is shown in use with a cable hoisting drum 12 used to raise and lower a drill string 14 via cable 16 in a well 18, the drill string having a drilling bit 20 at the end. The disk brake apparatus 10 is operated via actuating lever 22.

Referring now to FIG. 1, a derrick 24 is positioned over the well 18 and supports a crown block 26 at the top, this crown block comprising a plurality of sheaves with a traveling block 28 suspended from the crown block by means of the cable 16. The drill string 14 is connected to the traveling block 28 via a kelly 30 which traverses a rotary table 32 for rotating the drill bit 20.

The cable 16 has a "dead" end 34 that is non-moving and a "fast" end 36 that moves most rapidly in normal operation since it is spooled onto or from the cable drum 12. The dead end or deadline 34 is wound around a spool 38 and is connected with an anchor cable storage drum 40, to facilitate spooling off worn cable and replacing it with new cable.

The cable drum 12 is rotated in one direction by suitable power equipment, not shown, for raising the traveling block 28 and the drill string 14. The cable drum is also rotated in the opposite direction by the weight of the drill string to pay out cable and lower the weight of the drill string onto the drilling bit 40. Pay out of the cable 16 from the cable drum 12 is controlled by the disk brake apparatus 10 in accordance with the invention.

THE BRAKE CALIPERS AND DISKS

Turning now to FIG. 2, an enlarged view of the disk brake apparatus 10 and the cable drum 12 is shown. The disk brake apparatus 10 comprises a first pair of brake calipers 42 including outer caliper 43 and inner caliper 44, a first brake disk 45, a second pair of brake calipers 46 including outer caliper 47 and inner caliper 48, and a second brake disk 49. The first pair of calipers 42 is supported by a bracket 50 in the form of a tube having a rectangular cross section and similarly the second pair of calipers 46 is supported by a bracket 52. As will be described in more detail hereinafter, each of these brackets is ultimately coupled to a fixed support 54 as seen in FIGS. 1 and 3.

As seen in FIG. 2, a main shaft 56 is rotatably supported via brace 58 at one end and a second brace 59 at the other end (FIGS. 6 and 7), these braces also being coupled to the support 54 if desired or to another fixed support. Shaft 56 is rotatably supported in these braces via suitable bearings as desired and is rotated by any suitable power equipment, not shown. The two brake disks 45 and 49 are suitably rigidly coupled to shaft 56 for rotation therewith.

Similarly, the drum 12 is rigidly coupled by suitable means to the shaft 56 for rotation therewith, the drum having the cable 16 thereon between a pair of drum flanges 60 and 62. These drum flanges could be rigidly coupled to the brake disks if desired.

As seen in FIG. 2, the outer caliper 43 has rigidly coupled to it an upper housing 64 which slidably receives a pair of friction pads 65 and 66 and a lower housing 68 which slidably receives friction pads 69 and 70. Similarly, the inner caliper 44 has upper and lower housings 72 and 73 rigidly coupled thereto, each housing once again slidably receiving a pair of friction pads, only those pads 75 and 76 being numbered in FIG. 2 regarding the upper housing.

Likewise in the second pair of calipers 46 the outer caliper 47 has rigidly coupled thereto an upper housing 78 and a lower housing 79, each carrying a pair of friction pads therein and the inner caliper 48 has rigidly coupled thereto an upper housing 80 and a lower housing 81, each likewise carrying a pair of friction pads.

Figure 4:
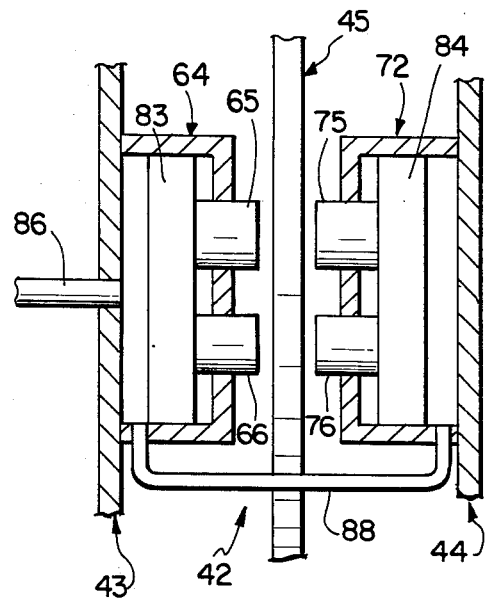
FIG. 4 is an enlarged sectional view of one of the pair of brake calipers shown in FIG. 2 showing the friction pads and the hydraulic pistons used to actuate them.

As seen in FIG. 4, the upper housings 64 and 72 in the first pair of calipers 42 are enlarged showing friction pads 65, 66, 75 and 76 transversely slidably received therein in suitable apertures, these pads being on opposite sides of the brake disk 45 and engageable therewith by means of actuation of a pair of hydraulic pistons 83 and 84 respectively slidably received inside housings 64 and 72. These housings in combination with the outer and inner calipers 43 and 44 each define hydraulic housings or "cylinders" for the slidable reception of the pistons therein. Actuation of these pistons, by providing a hydraulic force in the housings against the pistons, will drive the friction pads against the brake disk 45 to provide a braking action. In essence then, these pistons and housings form rectilinear motors powered by hydraulic pressure. This hydraulic pressure is delivered to housing 64 via hydraulic line 86 and to housing 72 via a cross over hydraulic line 88, FIG. 4, interconnecting these two housings. As seen in FIG. 3, a cover plate 90 can be placed over both housings and the cross over hydraulic line 88, or alternatively the two housings could be integrally formed together with an integral cross over duct. In addition, although not shown, return springs for the friction pads and the hydraulic pistons could be used if desired.

As is evident from FIG. 2, each of the housings shown coupled to the brake calipers are constructed substantially the same as the housings shown in FIG. 4 and have similar hydraulic pistons actuating the friction pads into engagement with their respective brake disks.

Alternatively, an anvil-type of brake could be used where friction pads on one side of the disc are fixed to the outer or inner calipers which have limited motion as a unit slidably on rod 181 so that the reaction force from the rectilinear motors on the opposite side is used to drive the friction pads on the one side against the brake disk.

THE OVERALL HYDRAULIC SYSTEM

Figure 5:
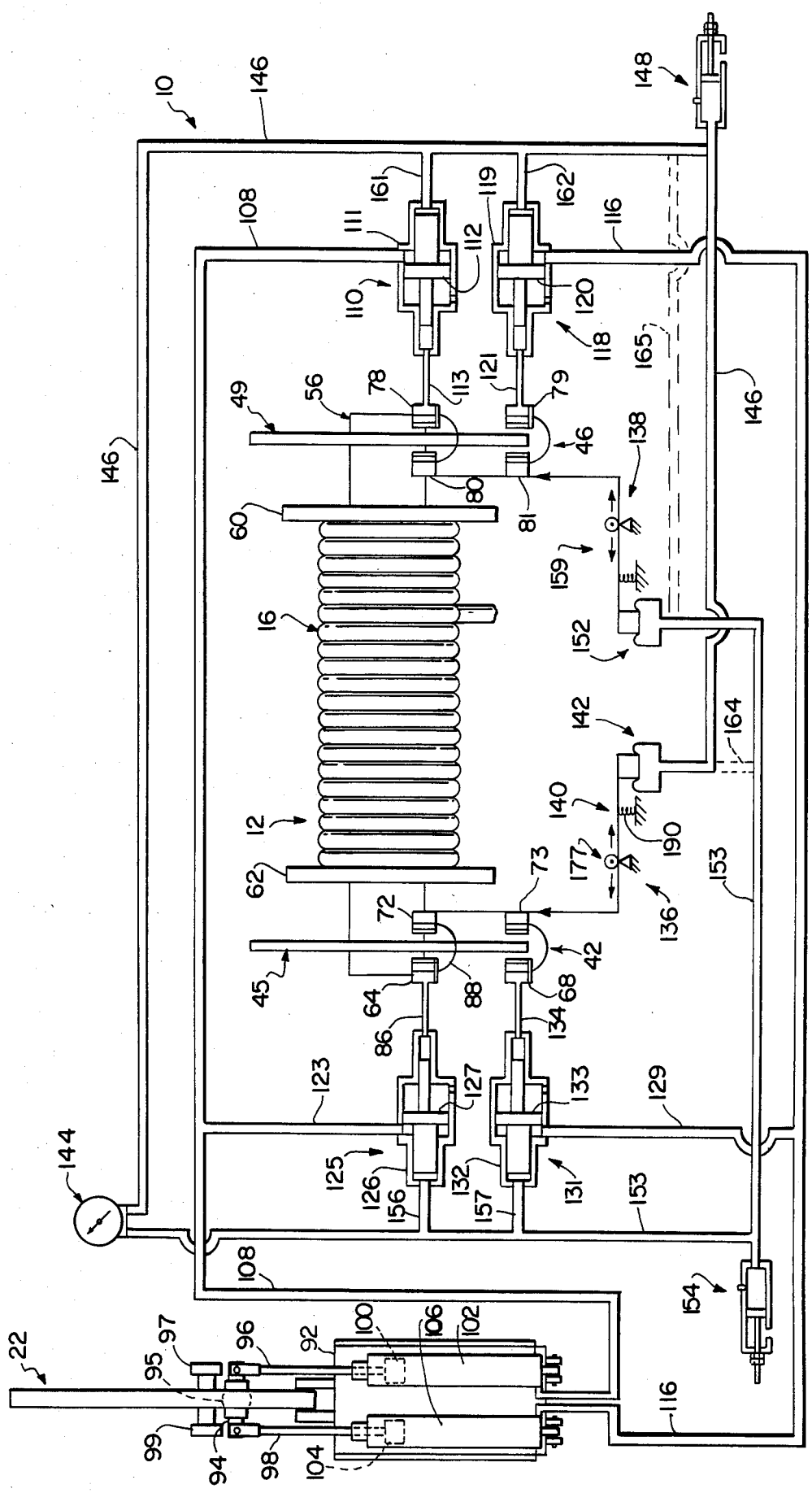
FIG. 5 is a hydraulic schematic of the invention including two pairs of brake calipers, two brake disks coupled to a hoisting drum, and two torque converters.

Turning now to FIG. 5, the overall hydraulic system for the disk brake apparatus 10 in accordance with the invention is shown in combination with the shaft 56, drum 12 carrying the cable 16, and the brake disks 45 and 49. As seen in the center of FIG. 5 adjacent each of the brake disks, the four rectilinear motors comprising housings 64, 68, 72 and 73 and their pistons are associated with and intended to brake the brake disk 45 and the four rectilinear motors comprising housings 78, 79, 80 and 81 and their pistons are associated with and intended to brake the brake disk 49.

Beginning on the left of FIGS. 3 and 5, the actuating lever 22 is shown pivotally coupled at one end to a support 92 and having a transverse actuating beam 94 pivotally coupled thereto via a ball joint 95 and pivotally engaging at its ends a pair of piston rods 96 and 98. The pivotal movement of beam 94 is limited by stops 97 and 99 extending rigidly outwardly from opposite sides of lever 22 above piston rods 96 and 98. Piston rod 96 is rigidly coupled to a piston 100 which is slidably received in a hydraulic cylinder 102. Similarly, piston rod 98 is rigidly coupled to piston 104 which is slidably received in hydraulic cylinder 106. These hydraulic cylnders and pistons form a hydraulic fluid rectilinear pump which is actuated by pivotal movement of the actuating lever 22, this lever being movable between a first position and a second position. This movement generates an equalized hydraulic pressure in each of the cylinders proportional to the location of the lever between these first and second positions and is controlled by the operator. Failure of components, such as a hydraulic line, on one side of beam 94 to the associated intensifiers allows the other side of the beam to contact one of the stops, thus allowing pumping action on the unaffected side and preventing a loss of braking action.

A hydraulic fluid line 108 extends from cylinder 102 to a hydraulic intensifier or amplifier 110 which comprises an annular housing 111 having an annular piston 112 slidably movable therein. This intensifier 110 delivers hydraulic pressure to housing 78 via hydraulic fluid line 113. Similarly, a hydraulic fluid line 116 extends from cylinder 106 to another hydraulic intensifier 118 comprising a housing 119 and a piston 120 slidably movable therein, this intensifier 118 delivering hydraulic pressure to housing 79 via hydraulic fluid line 121. Thus, these intensifiers provide hydraulic forces to the friction pads in the second pair of calipers 46.

Extending from hydraulic fluid line 108 is hydraulic fluid line 123 which delivers hydraulic pressure to intensifier 125 comprised of housing 126 and piston 127. Hydraulic pressure is delivered from intensifier 125 to housing 64 via hydraulic fluid line 86, also shown in FIG. 4. Similarly, hydraulic fluid line 129 delivers hydraulic pressure from line 116 to intensifier 131 comprised of housing 132 and piston 133. Hydraulic pressure is delivered from intensifier 131 to housing 68 via hydraulic fluid line 134.

Thus, actuation of the actuating lever 22 will deliver hydraulic pressure to the four intensifiers 110, 118, 125 and 131 which will in turn amplify this pressure and deliver it to the eight housings associated with the two pairs of calipers and thus drive the friction pads against the rotating brake disks 45 and 49.

In order to provide the self-energizing capabilities to the disk brake apparatus 10 in accordance with the invention and in order to provide a physical indication to the operator via the actuating lever 22 that braking is actually taking place, a pair of torque converters 136 and 138, shown schematically in FIG. 5, are connected between the two pairs of brake calipers and the various intensifiers. The specific structure forming each torque converter is the same and such structure is specifically shown in FIG. 3, as well as FIGS. 6 and 7, regarding torque converter 136. As generally designated in FIGS. 3, 5, 6 and 7, torque converter 136 comprises a torque lever 140 pivotally coupled to the support 54 and coupled to the pair of calipers 42, and a hydraulic load cell 142 engageable by the torque lever and coupled in the hydraulic system as shown in FIG. 5. This torque converter converts the braking reaction force caused by the torque applied to the second pair of calipers 46 during braking to a hydraulic force that is applied to the friction pads in the first pair of calipers 42.

Referring specifically to FIG. 5, load cell 142 is connected to a visual indicator 144 via hydraulic fluid line 146. This indicator shows the amount of torque applied to the friction pads and brake calipers when braking a rotating disk. Line 146 is also connected to a variable volume chamber 148 for adjusting the volume enclosed by the overall hydraulic system. Similarly, a second hydraulic load cell 152 is connected via hydraulic fluid line 153 to a second variable volume chamber 154 and to the visual indicator 144.

In addition, hydraulic load cell 152 is connected to housings 126 and 132 in intensifiers 125 and 131 via hydraulic fluid lines 156 and 157 which extend from hydraulic fluid line 153. Thus, a load placed on the hydraulic load cell 152 will be directly transmitted to intensifiers 125 and 131, thereby generating an additional hydraulic force, this force being applied to the pistons in the various housings coupled to these intensifiers. Since the load applied to this load cell 152 is via a torque lever 159, which is coupled to the second pair of calipers 46 supporting housings 78, 79, 80 and 81, the torque applied to these calipers, when the friction pads therein engage the rotating disk, is converted to an additional hydraulic force which is proportional to the amount of torque so applied to the calipers. This additional hydraulic force is then applied to the housings in the first pair of calipers via intensifiers 125 and 131.

A similar hydraulic fluid connection is made between the first load cell 142 and intensifiers 110 and 118 via a pair of hydraulic fluid lines 161 and 162 which interconnect hydraulic fluid line 146 and these intensifiers. This is intended to deliver an additional hydraulic force from load cell 142 to the friction pads in the second pair of calipers 46.

By having the load cell on one side of the apparatus actuate the intensifiers on the other side, and vice versa, a balancing of the braking force is provided. This, however, can be omitted and each load cell can provide an additional hydraulic force to the pair of calipers to which it is coupled via the torque lever. This can be accomplished by hydraulic fluid lines 164 and 165 shown in dotted lines in FIG. 5 interconnecting, respectively, load cell 142 with hydraulic fluid line 153 and load cell 152 with hydraulic fluid line 146.

Alternatively, rather than having hydraulic pressure from cylinders 102 and 106 go directly to the various intensifiers, they could provide hydraulic pressure to each of the load cells, which would then transmit the pressure to the intensifiers.

Regarding the schematic shown in FIG. 5, one possible division of the hydraulic force could be the application of 10% of the force via each intensifier and 90% of the force via each load cell.

THE TORQUE CONVERTER MECHANISMS

In FIGS. 1-7, the torque converter mechanism comprises the torque levers 140 and 159 and the load cells 142 and 152.

Turning now to FIGS. 6 and 7, the load cell 142 is shown comprising an open-ended cylindrical tube 168 having one end closed via rigid plate 169 and a second end closed via a resilient diaphragm 170, which can be formed of rubber. The tube 168 is filled with hydraulic fluid which can exert a hydraulic pressure via hydraulic fluid line 146 communicating with the interior of the cylinder when the diaphragm 170 is downwardly biased by means of downward movement of the first end 172 of torque lever 140. In essence, the load cell 142 is a transducer which converts mechanical movement into hydraulic pressure.

Figure 8:
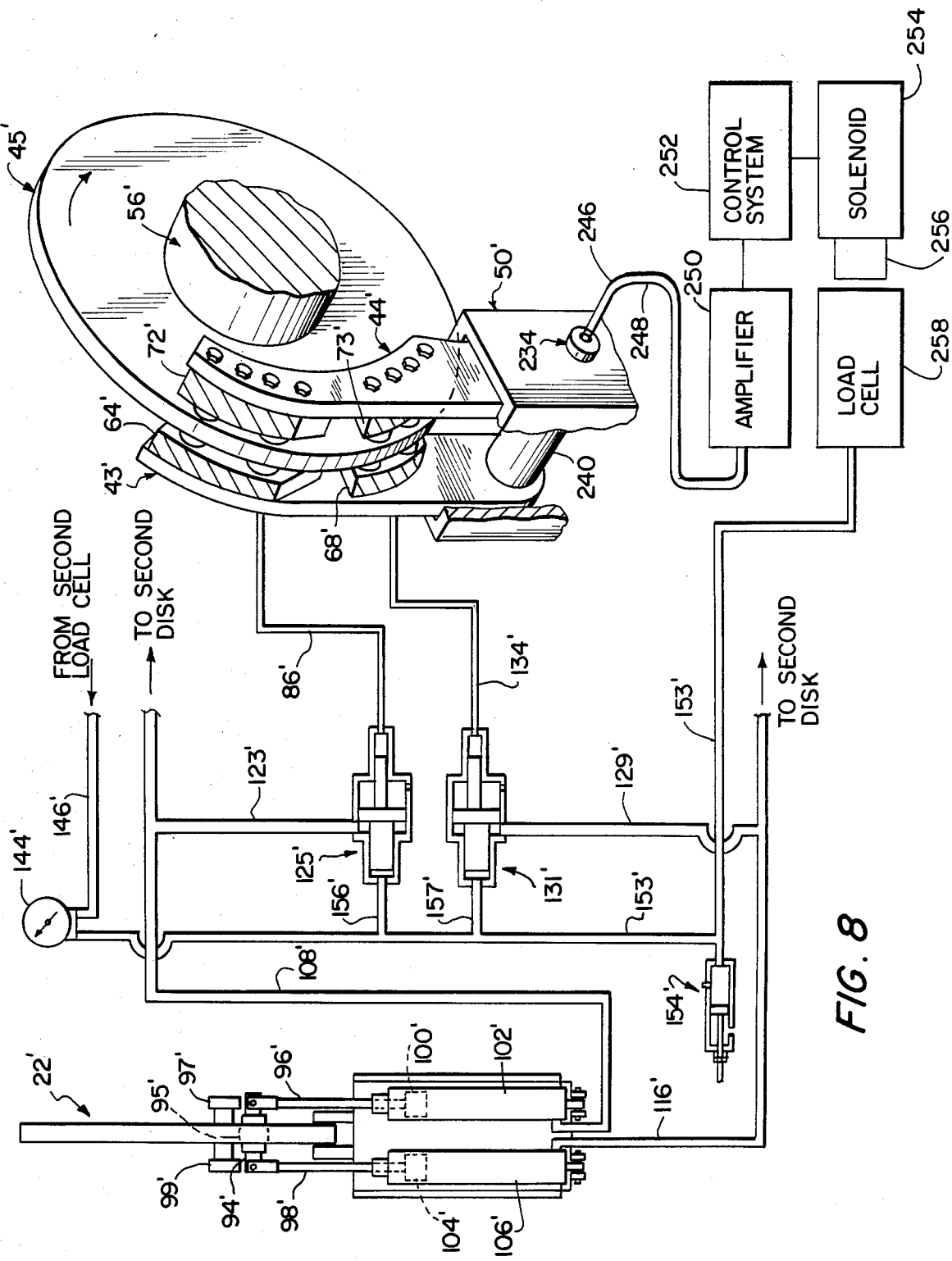
FIG. 8 is an enlarged perspective view of a modified embodiment of the invention where the torque converter comprises a shear strain gauge, this view showing only one disk brake and a portion of the hydraulic schematic therefor.

Rather than using the load cell shown in FIGS. 3 and 6-7, other types of transducers may be used, such as a hydraulic cylinder or a strain gauge load cell system generating hydraulic pressure such as shown in FIG. 8.

Turning now to FIGS. 3, 6 and 7, the torque lever 140 is shown comprised of a Y-shaped fork having legs 174 and 175. This torque lever is pivotally coupled to the support 54 via pivot assembly 177, the location of the pivot axis relative to the longitudinal axis of the torque lever being adjustable as will be described in detail hereinafter.

At the ends of legs 174 and 175 opposite from the first end 172, bracket 50 is pivotally coupled to the torque lever via pivot rod 179 which is horizontally oriented transversely of the torque lever and which is pivotally coupled in suitable apertures in both of the legs 174 and 175 and opposed sides of the bracket. Similarly, the calipers 43 and 44 forming the first pair of calipers 42 are pivotally coupled via pivot rod 181 to bracket 50, pivot rod 181 being suitably pivotally received in suitable apertures in the bracket and the calipers.

As is evident from FIG. 7, pivot rod 181 is horizontally oriented perpendicular to pivot rod 179, these pivot rods thereby universally coupling the calipers 43 and 44 to the torque lever 140. As best seen in FIG. 7, transverse rods 183 and 184 interconnecting legs 174 and 175 limit pivoting of the bracket 50 around pivot rod 179 and the bracket itself limits pivoting of the calipers around pivot rod 181. To limit the horizontal movement of the torque lever 140, the opposite ends of the lower pivot rod 179 extend into central vertically-oriented slots 186 and 187 on a pair of inverted U-shaped members 188 and 189, which are rigidly coupled to the support 54 and act as guides.

As seen in FIGS. 3, 6 and 7, a coiled spring 190 is interposed between the bottom of the torque lever 140 adjacent the load cell 142 and the top of the support 54 to provide a restoring force to the torque lever. This lever tends to be rotated counterclockwise around the pivot assembly 177 when the friction pads engage the rotating brake disk 45 due to an upward movement of the calipers as a result of the braking reaction force caused by the torque applied thereto. In particular, fork legs 174 and 175 of lever 140 contact cylindrical shaft 192 and pivot and roll thereabout, as against a wheel, the pivot axis thereof being the axis through the instantaneous centers.

ADJUSTMENT OF THE TORQUE LEVER

It is advantageous, as discussed briefly above, to adjust the location of the pivot axis of the torque lever to compensate for variations in the coefficient of friction between the friction pads and the brake disk and for variations in the weights of the calipers, which can be conventional devices and sold in differing weights by different manufacturers.

This adjustment is provided as seen in FIGS. 6 and 7, by slidably mounting the torque lever 140 between an upper pivot shaft 192 and a pair of lower pivot rods 193 and 194. These rods and the shaft are horizontally oriented and rigidly coupled between a pair of vertically oriented plates 195 and 196, the lower pivot rods being slidably received in a rectangular-shaped aperture 197 in a plate 198, which plate is rigidly coupled to support 54. The top and bottom of the slot are planar and horizontally oriented.

The two plates 195 and 196 can be moved longitudinally of the torque lever 140 by a series of links and maintained in that position via a detent pin 200 received in an upright guide 202 having a plurality of apertures 204 therein for receiving the detect pin. This is shown in FIG. 6, where plate 195 has an extension 206 thereon which is pivotally coupled to a link 208 via a pivot pin 210. This link 208 is in turn pivotally coupled to a L-shaped link 212 via pivot pin 214, the L-shaped link 212 being pivotally coupled via pivot pin 216 to an upright support 218. A bracket 220 extends from upright support 218 and rigidly supports the guide 202. The detent pin 200 extends from a rod 222 which is pivotally coupled via pivot pin 224 to the L-shaped link 212. While only plate 195 is shown linked to the detent pin, the other plate 196 could be similarly connected if desired. In all events, moving the detent pin 200 upwardly or downwardly relative to the guide 202 results in a longitudinal movement of plates 195 and 196, thereby sliding shaft 192 and pivot rods 193 and 194 relative to the torque lever 140 and supporting plate 198, and thus varying the pivot axis of the torque lever. Rather than the structure shown, other systems can be used to vary the position of the lever's pivot axis, such as a hydraulic cylinder controlled by a pilot valve responding to signals from, e.g., control system 252 shown in FIG. 8.

OPERATION

With reference to FIGS. 3 and 5, the operation of the disk brake apparatus 10 in accordance with the invention generally comprises exerting a hydraulic force on the brake disks 45 and 49 via the friction pads in the calipers as the drum 12 rotates with the brake disks, this hydraulic force being applied via movement of the actuating lever between its first and second positions. This movement provides equalized actuation of the hydraulic fluid pump created by pistons 100 and 104 and cylinders 102 and 106 resulting in actuation of intensifiers 125 and 131 regarding brake disk 45 and intensifiers 110 and 118 regarding brake disk 49. This movement also provides actuation of one piston and cylinder and set of intensifiers in the event of failure of components associated with the other piston.

When the friction pads are thus urged into contact with the rotating brake disks, a torque is applied to these pads due to rotation of the brake disks, this torque causing a braking reaction force on the pads and calipers and tending to pivot the torque lever 140 counterclockwise so that its first end 172 depresses the diaphragm 170 on the load cell 142 in FIGS. 3, 6 and 7. This activates the load cell to deliver an additional hydraulic pressure to the opposite brake disk via the opposite intensifiers 110 and 118. Simultaneously, the other hydraulic load cell 152, via engagement with torque lever 159, will generate a second additional hydraulic pressure which will be applied to intensifiers 125 and 131 and thereby act on the friction pads engaging brake disk 45.

Thus, the combination of the torque lever and the load cell convert the braking reaction force caused by the torque applied to the calipers, when the friction pads engage the rotating disk, to an additional hydraulic force which is proportional to the amount of torque so applied to the calipers, this force being then applied to the hydraulic pistons and thus the friction pads adjacent thereto.

In essence, this pivoting of the torque lever determines the amount of circumferentially directed torque applied to the friction pads after the pads engage the rotating disk and results in generating the additional hydraulic force on each of the friction pads.

As the torque applied to the friction pads increases, resulting from an increased braking action of the pads on the brake disk, a larger additional hydraulic force will be directed to the respective intensifiers. Thus, the operator who is manipulating the actuating lever 22 will note that it is easier to maintain the lever in a given position because of the additional force generated by the positive braking action. On the other hand, if slippage begins to occur between the brake disk and the friction pads, then the torque applied to the pads will be less, thereby resulting in less of an additional hydraulic force being applied to the friction pads. In this instance, the operator will note that it is harder to maintain the actuating lever 22 in a given position because of the lessening of this additional hydraulic force. Accordingly, the apparatus in accordance with the invention provides a physical indication, or feel, to the operator with regard to the actuating lever. Thus, if the operator is momentarily diverted from observing the rotation of the drum, the physical indication in the lever itself of the braking activity will still be conveyed.

Moreover, the apparatus in accordance with the invention provides a self-energization to the brake system since, as the friction pads are applied to the disks and a torque results, this torque will provide an additional hydraulic force tending to tighten the grip of the friction pads on the brake disk.

EMBODIMENT OF FIGS. 8 AND 9

Figure 9:
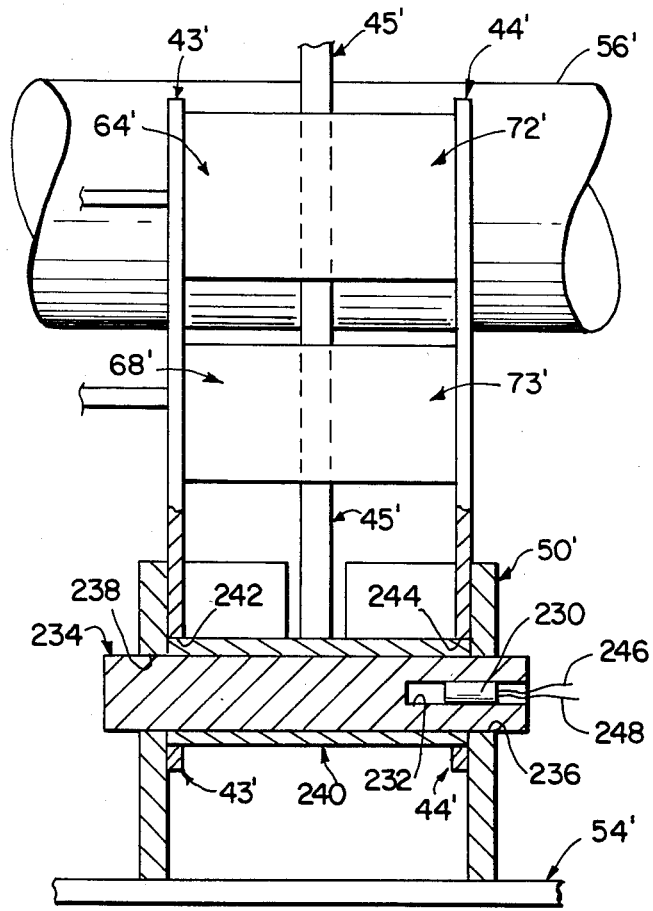
FIG. 9 is an enlarged side elevational view with parts broken away showing the positioning of the strain gauge in the apparatus shown in FIG. 8.

In FIGS. 8 and 9, a modified embodiment is shown which is similar to that shown in FIGS. 1-7 and described above except that torque levers are not used. Rather, shear-measuring strain gauges are used to determine the amount of torque applied to the friction pads after the pads engage the rotating disk and this strain gauge, in association with a load cell similar to the cells discussed above, generate the additional force on each of the friction pads tending to drive each pad against the disk, this additional force being proportional to the amount of torque so applied to the friction pads.

As seen in FIGS. 8 and 9, most of the structure shown in FIGS. 1-7 and relating to the first pair of calipers is repeated but with the addition of a prime.

Rather than using the torque lever as above, a strain gauge 230 is located inside a blind bore 232 coaxial with a rod 234. This rod is received in opposed coaxial bores 236 and 238 in opposite sidewalls of the bracket 50', which is rigidly coupled to fixed support 54'. Surrounding this rod 234 is a cylindrical tube 240 which is received in bores 242 and 244 formed respectively in calipers 43' and 44'.

Thus, as seen in FIG. 9, the calipers 43' and 44' cannot move upwardly relative to the bracket 50' due to the connection thereof with the bracket via tube 240 and rod 234 but can have limited motion slidably along rod 234 permitting friction pads fixed to the calipers to contact the brake disk as when an anvil-type of brake is used. The strain gauge 230 is positioned so that it is intersected by the vertical plane formed between the interface of the inside surface of bracket 50' and the outside surface of caliper 44'. An additional strain gauge on the other end of rod 234 can be utilized if desired.

In all events, the torque applied to the calipers 43' and 44' when the friction pads coupled thereto engage brake disk 45' causes an upward force on these calipers, which is red by the strain gauge 230.

This strain gauge has electrical leads 246 and 248 extending therefrom out the blind bore 232 to an amplifier 250. This amplifier receives and amplifies the electrical signal from the strain gauge 230 via leads 246 and 248 and then transmits this amplified signal to a control system 252. This control system is a conventional electrical device, such as that referred to in U.S. Pat. No. 3,685,288 to Cordrey, the disclosure of which is hereby incorporated by reference, which will take the amplified electrical signal from the amplifier and convert it into an electrical signal which is proportional to the torque applied to the calipers and measured by the strain gauge and transmit this electrical signal to activate a solenoid 254. This solenoid in turn has a movable magnetic core 256 which will be moved into engagement with a hydraulic load cell 258 upon transmission of the electrical signal from the control system to the solenoid. This engagement of the movable core onto the load cell 258 will result in generation of an additional hydraulic force which will be conveyed from the load cell via hydraulic fluid lines 153', 156' and 157' to the pair of intensifiers 125' and 131'. In turn, via hydraulic fluid lines 86' and 134', this additional hydraulic force will be conveyed to the friction pads carried in housings 64', 68', 72' and 73' supported by calipers 43' and 44', providing the same results as discussed regarding FIGS. 1-7.

Rather than using a shear-measuring strain gauge, any other type of strain gauge can be used to measure the torque applied to the calipers.

In all events, the combination of the strain gauge 230 and the load cell 258 constitutes a converter mechanism for converting the torque applied to the calipers into an additional hydraulic force applied to the brake pads engaging the brake disk 45'. As noted in FIG. 8, the load cell 258 acts on the same set of calipers, to provide the additional hydraulic force, from which it receives a signal representing the torque applied to these calipers.

While various advantageous embodiments have been chosen to illustrate the invention, it will be understood by those skilled in the art that various changes and modifications can be made therein without departing from the scope of the invention as defined in the appended claims. For example, other means of converting the signal from the control system 252 to a force on the load cell 258 can be used, such as a jack screw driven by an electric motor. Also, other means of converting the signal from the control system 252 to a hydraulic pressure can be used, such as a hydraulic cylinder controlled by a pilot valve responding to signals from the control system 252.

What is claimed is:

1. A disk brake apparatus for a cable hoisting drum mounted for rotation and having a brake disk coupled for rotation therewith, the combination comprising:
   a support located adjacent the drum;
   a pair of brake calipers having an opposed pair of friction pads thereon located on opposite sides of the brake disk, and having a pair of hydraulic rectilinear motors for driving said pads against the brake disk;
   means for coupling said calipers to said support;
   a hydraulic fluid pump having an actuating lever movable between first and second positions and generating a hydraulic force proportional to the location of said lever between said first and second positions;
   hydraulic fluid lines interconnecting said pump and said motors for delivering said hydraulic force to each of said motors and thus to said friction pads as generated by said actuating lever; and
   adjustable converter means, coupled to said pair of brake calipers and to said hydraulic fluid lines, for converting the braking reaction force caused by the torque applied to said calipers, when said friction pads engage the rotating disk, to an additional hydraulic force proportional to the amount of torque so applied to said calipers and applying this additional hydraulic force to said motors.

2. An apparatus according to claim 1, and further comprising
   indicator means, coupled to said converter means, for providing a visual indication of the amount of torque applied to said brake calipers.

3. An apparatus according to claim 1, wherein said converter means comprises
   a load cell including a tube having an open end and a closed end, said tube having hydraulic fluid therein, and a resilient diaphragm closing said open end.

4. An apparatus according to claim 1, wherein said converter means comprises
   a torque lever coupled to said calipers, and
   means for pivotally coupling said lever to said support about a pivot axis.

5. An apparatus according to claim 4, wherein said converter means further comprises
   means for pivotally coupling said brake calipers to said torque lever.

6. An apparatus according to claim 5, wherein said means for pivotally coupling said brake calipers to said torque lever comprises
   means for pivotally coupling said brake calipers to said torque lever about two perpendicular axes.

7. An apparatus according to claim 4, wherein said means for pivotally coupling said lever to said support comprises
   means for adjusting the pivot axis between said torque lever and said support longitudinally of said torque lever.

8. An apparatus according to claim 4, wherein said converter means further comprises
   load cell means, engageable with said torque lever, for converting mechanical pivotal movement of said torque lever into said additional hydraulic force,
   said load cell means being coupled to said hydraulic lines.

9. A disk brake apparatus for a drum mounted for rotation and having a brake disk coupled for rotation therewith, the combination comprising:
   support located adjacent the drum;
   a brake caliper having a friction pad thereon located adjacent a side of the brake side, and having a hydraulic rectilinear motor for driving said pad against the brake disk;
   means for coupling said caliper to said support;
   a hydraulic fluid pump having an actuating lever movable between first and second positions and generating a hydraulic force proportional to the location of said lever between said first and second positions;
   a hydraulic fluid line interconnecting said pump and said motor for delivering said hydraulic force to said motor and thus to said friction pad as generated by said actuating lever; and
   converter means, coupled to said brake caliper and to said hydraulic fluid line, for converting the braking reaction force caused by the torque applied to said caliper, when said friction pad engages the rotating disk, to an additional hydraulic force proportional to the amount of torque so applied to said caliper and applying this additional hydraulic force to said motor,
   said converter means comprising a strain gauge coupled to said brake caliper and to said support for generating a signal proportional to the amount of torque applied to said brake caliper.

10. An apparatus according to claim 9, wherein said converter means further comprises
    load cell means for converting said strain gauge signal into said additional hydraulic force.

11. A disk brake apparatus for a cable hoisting drum mounted for rotation and having first and second brake disks mounted for rotation therewith, the combination comprising:
    a support located adjacent the drum;
    first and second pairs of brake calipers, each pair having an opposed pair of friction pads thereon located on opposite sides of a respective one of the brake disks, and having a pair of hydraulic rectilinear motors for driving said pads against a respective one of the brake disks;
    means for coupling said first and second pairs of calipers to said support;
    a hydraulic fluid pump having an actuating lever movable between first and second positions and generating a hydraulic force proportional to the location of said lever between said first and second positions;
    first and second hydraulic fluid lines interconnecting, respectively, said pump and said motors in said first pair of brake calipers, and said pump and said motors in said second pair of brake calipers, for delivering said hydraulic force to each of said motors, and thus to said friction pads, as generated by said actuating lever; and
    converter means, coupled to said first and second pairs of brake calipers and to said first and second hydraulic fluid lines, for converting the braking reaction force caused by the torque applied to each of said first and second pairs of brake calipers, when said friction pads engage the rotating first and second disks, to two additional hydraulic forces proportional to the amount of torque so applied to said calipers and applying these additional forces separately to said motors in said first and second pair of brake calipers.

12. An apparatus according to claim 11, wherein said first and second hydraulic fluid lines include means for conveying the additional hydraulic force proportional to the amount of torque so applied to said first pair of brake calipers to said motors on said second pair of brake calipers, and for conveying the other additional hydraulic force proportional to the amount of torque so applied to said second pair of brake calipers to said motors on said first pair of brake calipers.

13. An apparatus according to claim 11, wherein said first and second hydraulic fluid lines include means for conveying the additional hydraulic force proportional to the amount of torque so applied to said first pair of brake calipers to said motors on said first pair of brake calipers, and for conveying the other additional hydraulic force proportional to the amount of torque so applied to said second pair of brake calipers to said motors on said second pair of brake calipers.

* * * * *